US012712210B2

(12) United States Patent
Miller et al.

(10) Patent No.: US 12,712,210 B2
(45) Date of Patent: Aug. 18, 2026

(54) LAMINATED OXIDATION PROTECTED SEPARATOR

(71) Applicant: Daramic, LLC, Charlotte, NC (US)

(72) Inventors: Eric H. Miller, Philpot, KY (US); J. Kevin Whear, Utica, KY (US); John R. Timmons, Owensboro, KY (US); Jeffrey K. Chambers, Philpot, KY (US); Pierre A. Hauswald, Dorlisheim (FR)

(73) Assignee: DARAMIC, LLC, Charlotte, NC (US)

( * ) Notice: Subject to any disclaimer, the term of this patent is extended or adjusted under 35 U.S.C. 154(b) by 0 days.

(21) Appl. No.: 14/200,066

(22) Filed: Mar. 7, 2014

(65) Prior Publication Data

US 2014/0255752 A1 Sep. 11, 2014

Related U.S. Application Data

(60) Provisional application No. 61/774,144, filed on Mar. 7, 2013.

(51) Int. Cl.
*H01M 10/12* (2006.01)
*H01M 50/414* (2021.01)
(Continued)

(52) U.S. Cl.
CPC ......... *H01M 10/12* (2013.01); *H01M 50/414* (2021.01); *H01M 50/417* (2021.01); (Continued)

(58) Field of Classification Search
CPC ...... H01M 2/16; H01M 50/449; H01M 50/44; H01M 50/463; H01M 50/431; H01M 50/411; H01M 10/06
See application file for complete search history.

(56) References Cited

U.S. PATENT DOCUMENTS 4,288,503 A 9/1981 Goldberg
4,465,748 A 8/1984 Harris
(Continued)

FOREIGN PATENT DOCUMENTS

CA 2062419 A1 9/1992
EP 1585182 A1 10/2005
(Continued)

OTHER PUBLICATIONS

K. Ihmels and W. Boehnstedt, "Chapter 7—Separator Materials for Valve-Regulated Lead-Acid Batteries," Valve-Regulated Lead-Acid Batteries, Elsevier, D.A.J. Rand et al. editors, (p. 184-205), (2004).
(Continued)

*Primary Examiner* — Nathanael T Zemui
(74) *Attorney, Agent, or Firm* — J. Clinton Wimbish; Maynard Nexsen PC

(57) ABSTRACT

A battery separator for a lead acid battery addresses the issues of acid stratification and separator oxidation arising from contaminants. The separator includes a microporous membrane and a diffusive mat affixed thereto. The diffusive mat has a three hour wick of: at least about 2.5 cm. The diffusive mat may be made of synthetic fibers, glass fibers, natural fibers, and combinations thereof. The diffusive mat may include silica. The separator may include a rubber.

19 Claims, 5 Drawing Sheets

(51) Int. Cl.

| | |
|---|---|
| ***H01M 50/417*** | (2021.01) |
| ***H01M 50/429*** | (2021.01) |
| ***H01M 50/437*** | (2021.01) |
| ***H01M 50/44*** | (2021.01) |
| ***H01M 50/454*** | (2021.01) |
| *H01M 10/06* | (2006.01) |
| *H01M 50/463* | (2021.01) |

(52) U.S. Cl.

CPC ....... *H01M 50/429* (2021.01); *H01M 50/437* (2021.01); *H01M 50/44* (2021.01); *H01M 50/454* (2021.01); *H01M 10/06* (2013.01); *H01M 50/4295* (2021.01); *H01M 50/463* (2021.01)

(56) References Cited

U.S. PATENT DOCUMENTS

| | | | | |
|---|---|---|---|---|
| 5,154,988 | A * | 10/1992 | Choi | H01M 2/0262 429/142 |
| 5,221,587 | A * | 6/1993 | Bohnstedt | H01M 2/0262 429/145 |
| 5,468,575 | A | 11/1995 | Holland et al. | |
| 5,665,488 | A | 9/1997 | Young et al. | |
| 5,962,161 | A | 10/1999 | Zucker | |
| 5,989,750 | A * | 11/1999 | Ohba | H01M 2/1606 264/331.11 |
| 6,242,127 | B1 * | 6/2001 | Paik | H01M 2/164 429/145 |
| 6,492,059 | B1 | 12/2002 | Hattori et al. | |
| 6,506,522 | B2 | 1/2003 | Clough | |
| 6,689,509 | B2 | 2/2004 | Zucker | |
| 6,703,161 | B2 | 3/2004 | Zucker | |
| 6,852,444 | B2 | 2/2005 | Zucker | |
| 6,869,726 | B2 | 3/2005 | Zucker | |
| 7,094,498 | B2 | 8/2006 | Miller et al. | |
| 9,876,209 | B2 | 1/2018 | Deiters et al. | |
| 2002/0177033 | A1 * | 11/2002 | Doyama | H01M 50/655 429/72 |
| 2003/0054236 | A1 * | 3/2003 | Zucker | H01M 2/1606 429/145 |
| 2003/0054237 | A1 | 3/2003 | Zucker | |
| 2005/0003726 | A1 | 1/2005 | Zguris et al. | |
| 2005/0017684 | A1 * | 1/2005 | Brecht | H01M 10/44 320/131 |
| 2005/0042512 | A1 * | 2/2005 | Ferreira | H01M 10/10 429/204 |
| 2005/0084762 | A1 | 4/2005 | Vaccaro et al. | |
| 2006/0141350 | A1 | 6/2006 | Dreyer et al. | |
| 2007/0160903 | A1 * | 7/2007 | Sugie | H01M 2/266 429/161 |
| 2008/0113259 | A1 * | 5/2008 | Brilmyer | H01M 2/1666 429/50 |
| 2008/0299462 | A1 * | 12/2008 | Whear | H01M 2/145 429/247 |
| 2010/0129720 | A1 | 5/2010 | Sako et al. | |
| 2011/0091761 | A1 * | 4/2011 | Miller | H01M 2/162 429/143 |
| 2011/0229750 | A1 | 9/2011 | McClellan et al. | |
| 2011/0287324 | A1 * | 11/2011 | Rajaram | H01M 50/431 429/246 |
| 2011/0318629 | A1 | 12/2011 | Ho et al. | |
| 2012/0070714 | A1 | 3/2012 | Chambers et al. | |
| 2012/0094183 | A1 | 4/2012 | Deiters et al. | |
| 2013/0022860 | A1 * | 1/2013 | Minoura | H01M 10/06 429/163 |
| 2014/0227585 | A1 * | 8/2014 | Wertz | H01M 50/434 429/163 |
| 2015/0050540 | A1 * | 2/2015 | Toduka | H01M 4/14 429/136 |
| 2015/0099189 | A1 | 4/2015 | Ketzer et al. | |
| 2015/0194653 | A1 * | 7/2015 | Waterhouse | B29B 7/7495 264/211 |
| 2015/0372277 | A1 | 12/2015 | Honda | |

FOREIGN PATENT DOCUMENTS

| | | | |
|---|---|---|---|
| JP | S58-179761 | U1 | 12/1983 |
| JP | S58-212060 | A | 12/1983 |
| JP | S59-138058 | A | 8/1984 |
| JP | S61-245463 | A | 10/1986 |
| JP | S62-029059 | A | 2/1987 |
| JP | S62-090847 | A | 4/1987 |
| JP | H01-294352 | A | 11/1989 |
| JP | H02-066850 | A | 3/1990 |
| JP | H05-089868 | A | 4/1993 |
| JP | H07-034555 | A | 2/1995 |
| JP | 10-040896 | A | 2/1998 |
| JP | 2001-102027 | A | 4/2001 |
| JP | 2002-198023 | A | 7/2002 |
| JP | 2002-313305 | A | 10/2002 |
| JP | 2005-100808 | A | 4/2005 |
| JP | 2006-100082 | A | 4/2006 |
| JP | 2006-156060 | A | 6/2006 |
| JP | 2008-226697 | A | 9/2008 |
| JP | 2009-245901 | A | 10/2009 |
| JP | WO2013/008454 | A1 | 1/2013 |
| WO | WO2012/040407 | | 12/2015 |

OTHER PUBLICATIONS

K. Ihmels et al., “Chapter 7, Separator Materials for Valve-Regulated Lead-Acid Batteries,” Elsevier B.V., 2004, D.A.J. Rand et al. editors, pp. 183-205.

Jorg Deiters et al., “A New Polyethylene Separator for Heavy-Duty Traction Batteries,” Journal of Power Sources 158 (2006), Elsevier B.V., pp. 1069-1072.

M.L. Sorita et al., “Development of High Power VRLA Batteries Using Novel Materials and Processes,” Journal of Power Sources 5111 (2002), Elsevier B.V., pp. 1-12.

M. Perrin et al., “Effect of Compression on the Behaviour of Lead-Acid Batteries,” Journal of Power Sources 4071 (2000), Elsevier B.V., pp. 1-12.

M. Perrin et al., “Extending Cycle Life of Lead Acid Batteries: A New Separation System Allows the Application of Pressure on the Plate Group,” Reference info not available.

Extended European Search Report and European Search Opinion, Issued in Application No. 14760775.8, Oct. 28, 2016, 9 pages.

Besenhard, J.O., “Handbook of Battery Materials”, Wiley-VCH Verlag GmbH, Weinheim, Germany (1999), Ch. 9, pp. 245-292.

Battery Sharks; “Flooded and VRLA Batteries”, printed from https://blog.batterysharks.com/flooded-and-vrla-batteries on Dec. 2, 2021, pp. 1-4.

* cited by examiner

LAMINATED OXIDATION PROTECTED SEPARATOR

RELATED APPLICATION

This application claims the benefit of U.S. provisional application Ser. No. 61/774,144 filed Mar. 7, 2013, incorporated herein by reference.

FIELD OF THE INVENTION

The present invention is directed to a battery separator for a lead/acid batteries having a diffusive mat affixed to a microporous membrane.

BACKGROUND

In abusive heat applications (e.g., congested regions with high traffic, tropical or desert regions, outside storage applications and the like), batteries (e.g., lead acid batteries, particularly flooded lead acid (FLA) batteries) are prone to electrolyte loss. The electrolyte may be a mixture of water and acid (e.g., sulfuric acid). Loss of the electrolyte exposes the electrodes to the gaseous environment contained within the battery head-space and heat, which can ultimately lead to dry-out of the electrode plates and, in turn, accelerated corrosion of the electrodes that leads to premature battery failure.

Further, during charging of the battery (e.g., a lead acid battery), the acid in the electrolyte may become stratified. Acid stratification detrimentally impacts the performance and life of the battery. Prior art solutions to the acid stratification problem in batteries (e.g., lead acid batteries) include the use of 'glass mats' affixed to the separator. These glass mats, however, significantly drive up the cost of the separator, have large pores (thus, do not wick well), and in some cases do not lend themselves to high speed manufacturing techniques (e.g., formation of 'pockets' and welding to the separator).

In some areas of the world, for example, Asia, lead/acid batteries are sold as 'dry charge' batteries. These dry charge batteries are purchased without the water/acid included. The dry charge battery has a longer shelf life. However, the user may not be careful to fill the battery with uncontaminated water/acid. The contaminated water/acid will lead to oxidation of the separator and ultimately to battery failure. The contaminants in the water/acid may be sourced from the water/acid containers, e.g., steel drums.

Additionally, oxidation of the separator, e.g., separators for lead/acid batteries, may reduce a battery's cycle life, and thereby reduce the effective life of the battery. This oxidation may arise from contaminants in the water or acid added to the 'dry charge' battery. Oxidation causes the embrittlement (measured by, for example, loss of % elongation) of the separator which may lead to partial or complete failure of the battery.

Contaminants typically originate from the water and/or the sulfuric acid added to the battery, as well as from impurities in the alloys and active materials that comprise the electrode plates, and such contaminants may cause oxidation. Such contaminants typically include the transition metals of the periodic table, for example: chromium (Cr), manganese (Mn), titanium (Ti), copper (Cu), and the like. Contaminant levels (Cr, Mn, and/or Ti) of greater than about 2.0 ppm [2.0 mg/L] are not recommended. Cu contaminant levels greater than 26 ppm [26 mg/L] are not recommended.

U.S. Pat. No. 5,221,587 discloses the use of latex in the separator to prevent antimony (Sb) poisoning of the lead/acid battery. Antimony is sourced from the lead plates (electrodes) of the battery. Antimony is used as an alloying agent in the lead to improve the manufacture of the plates and the cycle life of the battery. Those of ordinary skill would not consider the teachings of U.S. Pat. No. 5,221,587 in arriving at a solution to the separator oxidation problem mentioned above.

U.S. Pat. No. 6,242,127 discloses the use of cured, porous rubber in a conventional polyolefin separator to improve the electrochemical properties (antimony suppression) of the separator.

There is a need for a new separator (e.g., for lead/acid batteries) that addresses the foregoing acid stratification and oxidation issues.

SUMMARY OF THE INVENTION

A battery separator for a lead acid battery addresses the issues of acid stratification and/or separator oxidation arising from contaminants. The separator includes a microporous membrane and a diffusive mat affixed thereto. The diffusive mat has a three hour wick of at least about 2.5 cm. The diffusive mat may be made of synthetic fibers, glass fibers, natural fibers, and combinations thereof. The diffusive mat may include silica. The separator may include a rubber.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
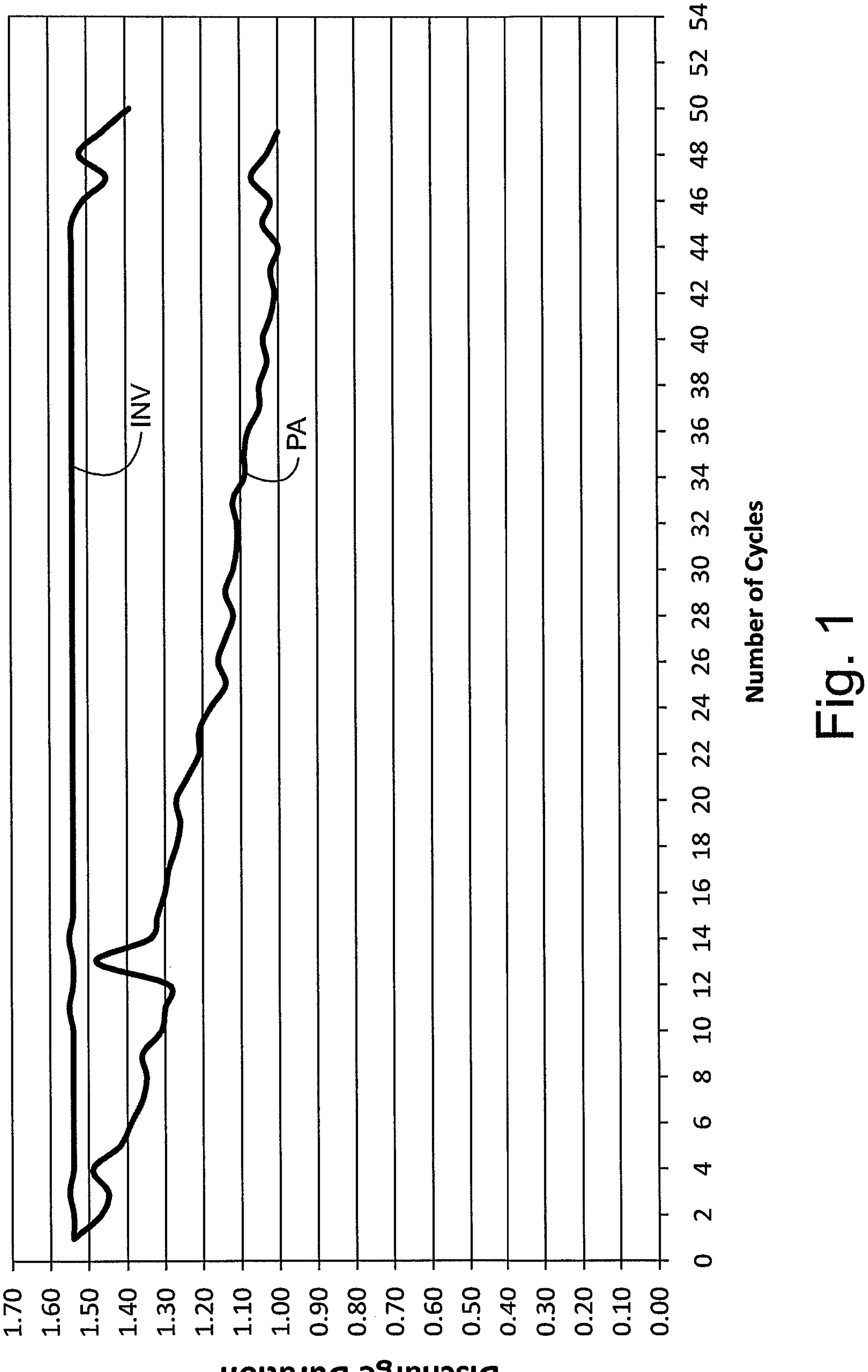
FIG. 1 is a graphical comparison of the inventive separator (diffusive mat), INV, versus a separator with a conventional glass mat, PA.

Lead/acid batteries are well known, see for example, Linden, *Handbook of Batteries*, $2^{nd}$ Edition, McGraw-Hill, Inc. New York, NY (1995) and/or Besenhard, *Handbook of Battery Materials*, Wiley-VCH Verlag GmbH, Weinheim, Germany (1999), both incorporated herein by reference. A separator may be used in any lead/acid battery. In one embodiment, the lead/acid battery is a flood lead/acid (FLA) battery, such as those used as inverter batteries, enhanced flood batteries (EFB), ISS batteries, stationary batteries, golf cart batteries, and the like.

In a first aspect of the invention, a diffusive mat (DM) is included with a microporous membrane to improve battery performance by, for example, imparting superior diffusion properties that retard acid stratification, reducing antimony poisoning, improving oxidation resistance, and improving micro short protection (arising from dendrite growth). The laminate of the DM and microporous membrane also protects against water loss by keeping the electrodes from drying out through the action of electrolyte wicking, thereby addressing the dry-out situation and protecting against acid stratification by improved diffusion properties.

The diffusive mat (DM) is not a conventional glass mat. Conventional glass mats are passive, and do not have diffusive or wicking capability. The DM may have the ability to wick 25× or more than the conventional wet or dry glass mat. The wicking rate is inversely proportional to the acid stratification. The conventional glass mat has a 'three hour wick' of no greater than 0.6 cm, while the DM has a 'three hour wick' of at least about 2.5 cm. Alternatively, the DM may have a 'three hour wick' of at least about 2.5 cm, or at least about 3.0 cm, or at least about 4.0 cm, or in the range of about 2.5-about 10.0 cm, or in the range of about 3.0-about 10.0 cm, or in the range of about 4.0-about 10.0 cm, or sub-combinations thereof.

The 'three hour wick' test is performed by inserting a standard sized piece of the material in a liquid (sulfuric acid with a specific gravity of 1.280), waiting three hours, and measuring the height of travel of the liquid up the material. 'Standard sized piece' means the same width and length, but thickness may vary according to the natural thickness of the material being tested, so that meaningful comparisons may be made. For the 'three hour wick' test, the sample has a width of 1 inch and a length of at least 40 cm. The sample is marked every centimeter up the vertical axis of the sample. The sample, held in a clamp above the liquid, is inserted into the liquid to a depth of 2 cm. The wick height is measured, from the graduations on the sample, at one, five, ten, and fifteen minutes and for a maximum wick height after three hours. The DM may further include a particulate filler, such as silica.

The DM may be laminated on to the microporous membrane in any manner. The DM may be affixed to the microporous membrane by welding or glue. The DM may be formed into pockets, sleeves, leaves, of an 'S' wrap. The DM may be a nonwoven or woven or knitted fabric made of fibers. The DM may be made of glass fibers, synthetic fibers, natural fibers, or combinations thereof. In one embodiment, the DM may be made of glass fibers and synthetic fibers. The DM has sufficient physical integrity to perform as a positive active material (PAM) retention mat and prevents shedding of PAM. The DM protects the separator from strong oxidizers (e.g., Cr, Mn, Ti). Several examples of suitable DM (INV) are set forth in the TABLE below, along with a comparison to conventional glass mats (Prior Art).

In use in the battery, the separator is placed in the battery, so that the DM faces, or is in contact with the positive electrode (or plate) of the battery. In one embodiment, the separator may envelope the negative and/or positive plate(s). In another embodiment, the separator may envelope the negative plate(s).

TABLE

| | | Diffusive Mat (DM) Synthetic fibers [INV] | | Diffusive Mat (DM) Glass fibers [INV] | | Conventional Glass Mat [Prior Art] | |
|---|---|---|---|---|---|---|---|
| | | Composition | | | | | |
| Category | Units | Synthetic fiber + Silica | Synthetic wood Pulp + Silica | Fine Glass fiber | Coated Glass fiber + Silica | Glass fiber retention mat[1] (wet-laid process) | Glass fiber retention mat (dry-laid process) |
| Overall | (mm) | 0.305 | 0.373 | 0.3 | 0.215 | 0.5 mm | 0.5 mm |
| Puncture | (N) | 23.1 | 9.9 | 9.3 | 12.6 | 14.4 | 7.8 |
| Tensile-MD | (N/mm$^2$) | 8.7 | 5.3 | 9.5 | 23 | 4.5 | 1.0 |
| Tensile-CMD | (N/mm$^2$) | 6.8 | 3.3 | 5.4 | 11.8 | 4.3 | 2.8 |
| ER (10/20) | (mohm-cm$^2$) | 41.7 | 87.6 | 12 | 15 | 2.7 | 2.3 |
| Basis Weight | (gsm) | 122.4 | 146.3 | 40 | 68 | 80.22 | 68.62 |
| 3 hour Wick | (cm) | 6 | 4.8 | 6.2 | 5.5 | 0.5 | 0 |
| Stiffness (MD) | (mN) | 456 | 324 | 92 | 392 | 192 | 192 |
| Stiffness (CMD) | (mN) | 377 | 259 | 47 | 241 | 355 | 355 |

[1]Commercially available from Johns-Manville as DURA GLASS B-20 (20 mil thick standard glass mat).

Microporous membranes may be made from: sheets of polyolefin (e.g., polyethylene, polypropylene, ultra high molecular weight polyethylene (UHMWPE), and combinations thereof), polyvinyl chloride (PVC), phenol-formaldehyde resins (including, for example, cellulosic and/or synthetic fiber impregnated with phenol-formaldehyde resins), crosslinked rubber, or nonwoven (e.g., inert fibers including cellulosic fibers or glass fibers). In one embodiment, the microporous membrane may be made from polyethylene, UHWMPE, or a combination of both and may include a particulate filler, as is known. The microporous membrane may have a ribbed profile. The ribs may be conventional, e.g., running in the machine direction (MD) on the side to the positive electrode (e.g., to, among other things, separate the separator from the positive electrode, and form gas channels that allow gas to escape and promotes mixing during over charge conditions), but the ribs may also extend in the cross machine direction (CMD) on the side to the negative electrode (to retard acid stratification).

In another aspect of the invention, rubber may be added to the separator to address the oxidation issue arising from the contaminants. Rubber, as used herein, refers to rubber latex, tire crumb, and combinations thereof. In one embodiment, the rubber may be un-cross-linked or uncured rubber. In another embodiment, the rubber latex may be natural or synthetic rubber latex. In another embodiment, the rubber may be natural rubber latex. In yet another embodiment, the rubber may be tire crumb. Natural rubbers may include, for example, any grade (e.g., latex grades), such as ribbed smoked sheet, white and pale crepes, pure blanket crepes or re-mills, thick brown crepes or ambers, and flat bark crepes. Natural rubbers may include Hevea rubbers. Synthetic rubbers may include, for example, methyl rubber, polybutadiene, chloropene rubbers, and copolymer rubbers. Copolymer rubbers may include, for example, styrene/butadiene rubbers, acrylonitrile/butadiene rubbers, ethylene/propylene rubbers (ELM and PERM), and ethylene/vinyl acetate rubbers. Other rubbers may include, for example, butyl rubber, bromobutyl rubber, polyurethane rubber, epichlorhydrin rubber, polysulphide rubber, chlorosulphonyl polyethylene, polynorborene rubber, acrylate rubber, fluorinated rubber, isoprene rubber, and silicone rubber. These rubbers may be used alone or in various combinations.

In one embodiment, the rubber may be impregnated into the microporous membrane. Impregnated, as used herein, means that the rubber is incorporated into the body of the separator, and is not a layer formed onto the separator. So, the rubber may be mixed or blended into one or more the materials used to from the separator. The rubber, for example the latex, is still chemically active (i.e., uncured and/or uncross-linked) after extrusion. Thus, the rubber is a component integral with, or distributed within, or uniformly blended throughout, or intimately blended in the materials of, the separator.

The rubber, as described above, may comprise any portion of the microporous membrane. In one embodiment, the rubber may comprise no more than about 12% by weight of the microporous membrane when added to the formulation (i.e., the 'by weight' of the raw materials before extrusion). In another embodiment, the rubber may comprise about 1-12% by weight of the microporous membrane. In another embodiment, the rubber may comprise about 1.2-6% by weight of the microporous membrane. In yet another embodiment, the rubber may comprise about 2-4% by weight of the microporous membrane. In still another embodiment, the rubber may comprise about 2.5-3.5% by weight of the microporous membrane. In another embodiment, the rubber may comprise about 3% by weight of the microporous membrane.

The microporous membrane may be made in any conventional fashion. For example, in a PE microporous membrane, the rubber may be mixed with the processing oil and mixed with the PE during extrusion.

EXAMPLES

Figure 2:
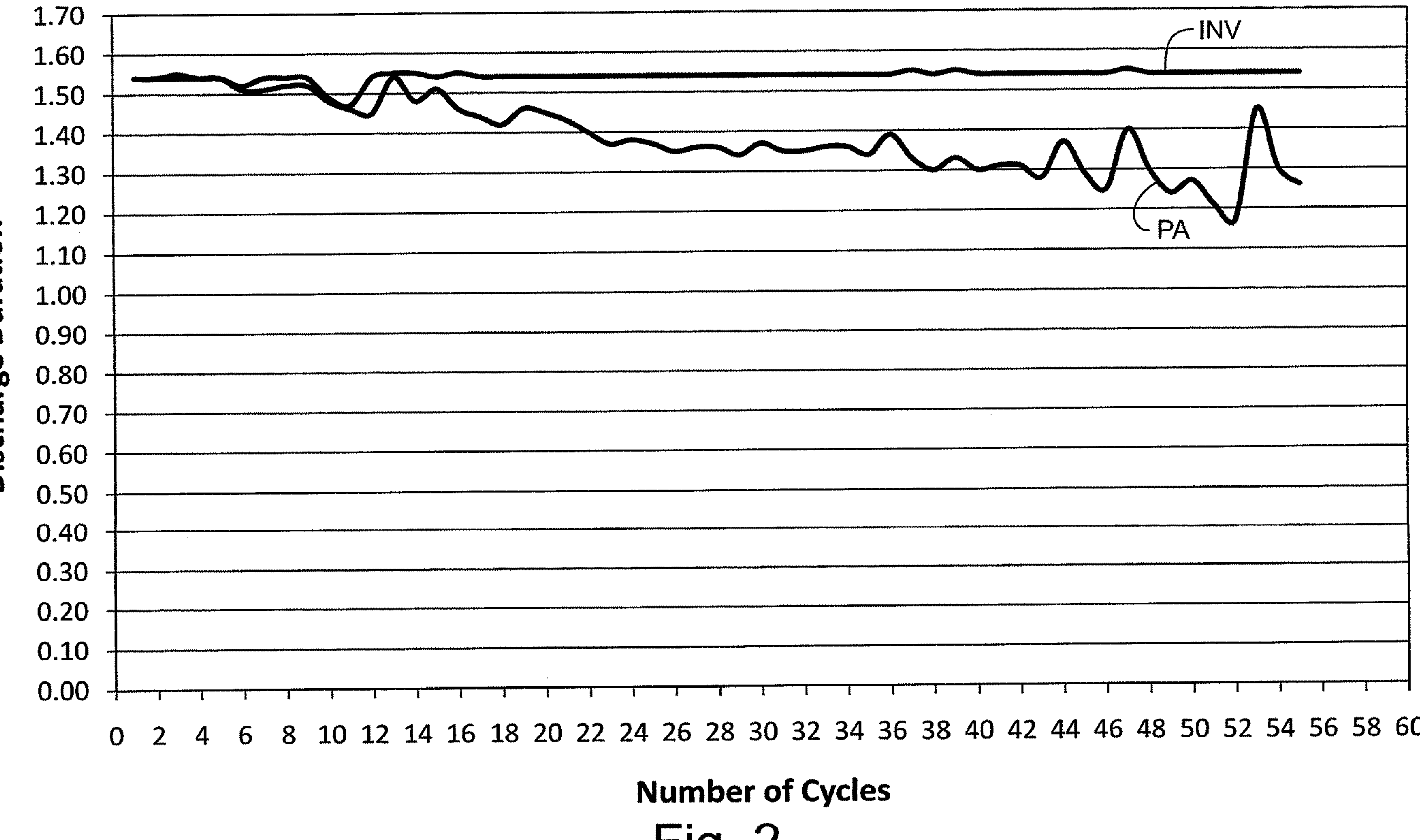
FIG. 2 is a graphical comparison of the inventive separator (diffusive mat), INV, versus another separator with a conventional glass mat, PA.
Figure 3:
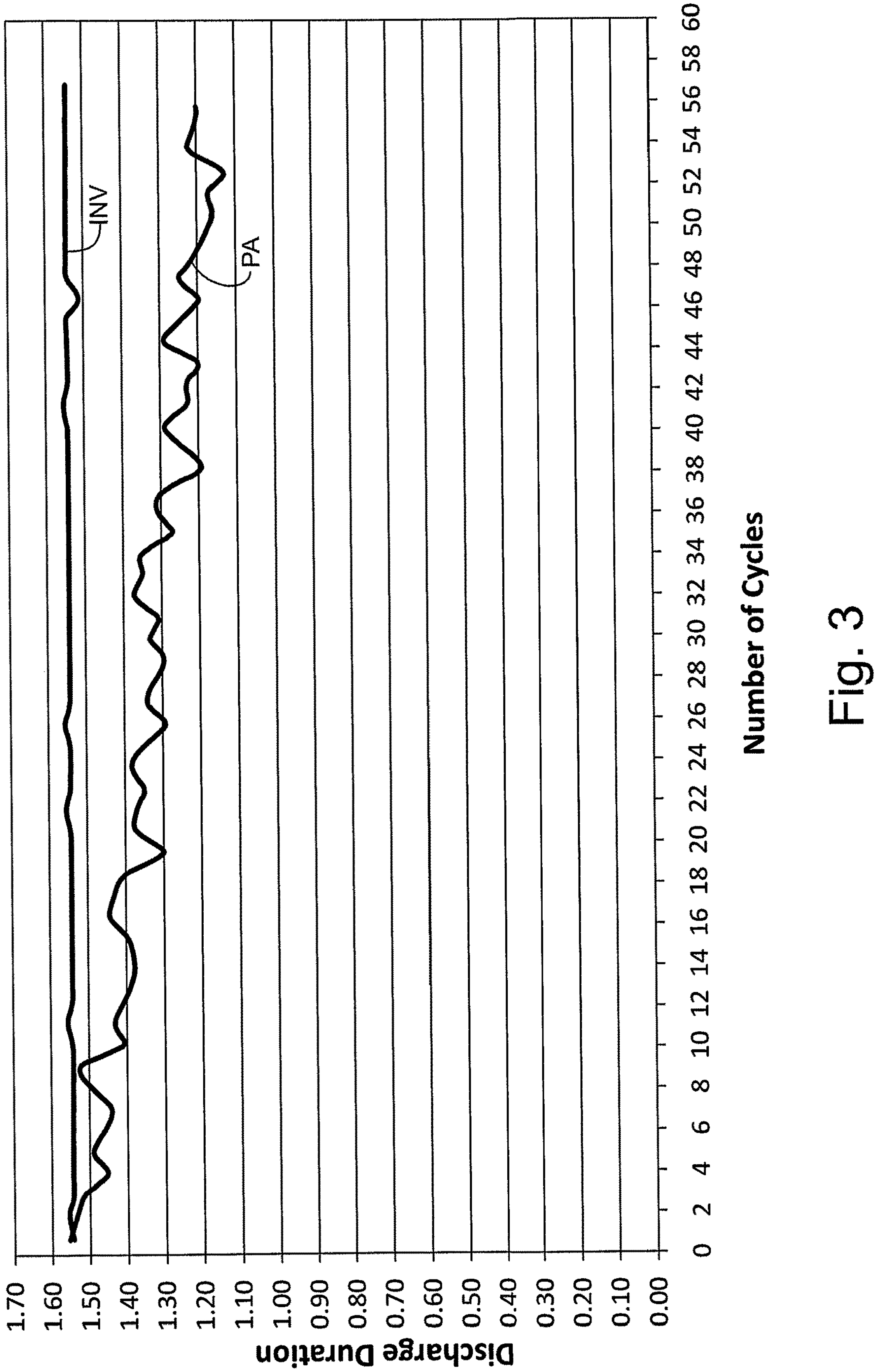
FIG. 3 is a graphical comparison of the inventive separator (diffusive mat), INV, versus another separator with a conventional glass mat, PA.
Figure 4:
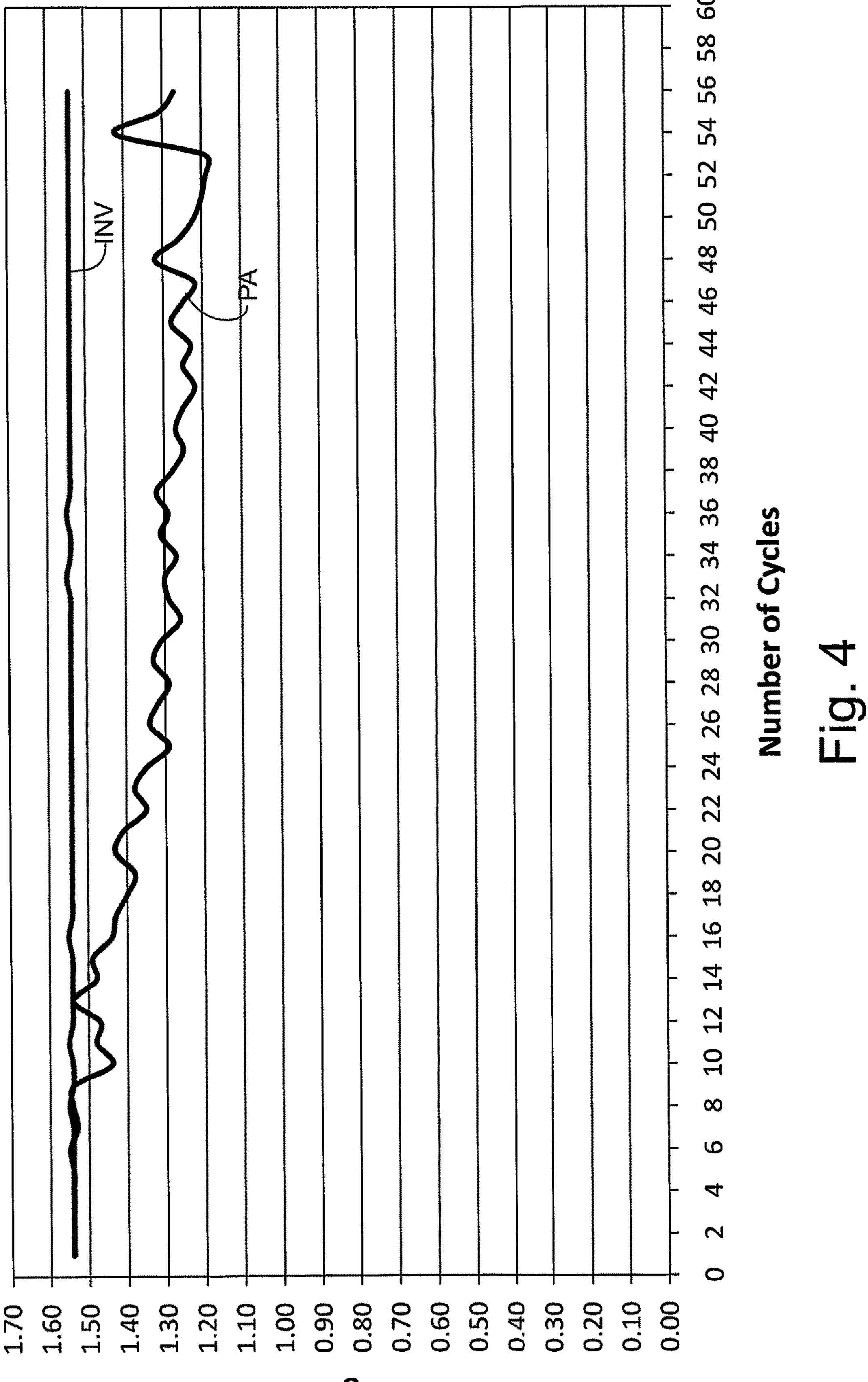
FIG. 4 is a graphical comparison of the inventive separator (diffusive mat), INV, versus another separator with a conventional glass mat, PA.
Figure 5:
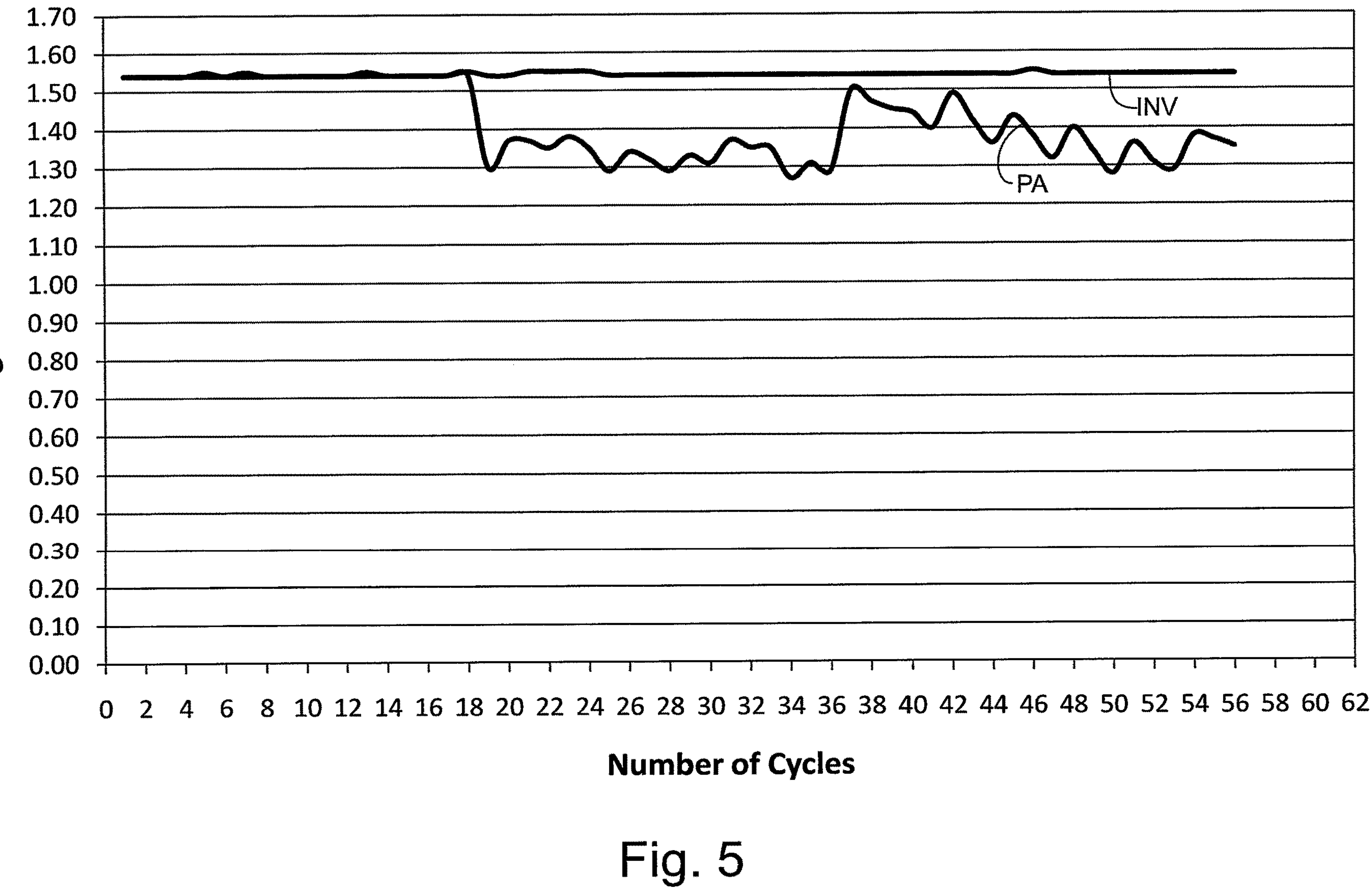
FIG. 5 is a graphical comparison of the inventive separator (diffusive mat), INV, versus another separator with a conventional glass mat, PA.

FIGS. (graphs) 1-5 are a comparison of the inventive separators with the diffusive mat (DM) to separators with the conventional glass mats. The separators are equivalent but one separator has the DM and the other has the conventional glass mat. The information presented in these graphs was generated using a conventional Inverter Battery Simulation using a 12V150 Ah battery ≈100% depth of discharge, DoD) with the positive plate enveloped (FIGS. 1-2) or the negative plate enveloped (FIGS. 3-5) and with a discharge at 43 A for 1 hour and 54 minutes at 10.50V, followed by recharge at 13.80V with a limit current of 15 A for 10 hours and 6 minutes.

The present invention may be embodied in other forms without departing from the spirit and the essential attributes thereof, and, accordingly, reference should be made to the appended claims, rather than to the foregoing specification, as indicated the scope of the invention.

We claim:

1. A flooded lead acid battery comprising a battery separator that comprises:

a microporous membrane comprising a microporous sheet of polyolefin, and wherein the microporous membrane is impregnated with uncured rubber, meaning that the uncured rubber is incorporated with a processing oil into the microporous membrane and is not a layer formed onto the microporous membrane; and a diffusive mat affixed to the microporous membrane, wherein said diffusive mat is made of natural fibers and optionally also includes synthetic fibers or glass fibers or combinations of glass and synthetic fibers; said diffusive mat further comprising a particulate filler and having an electrolyte wicking defined by a three hour wick of at least 2.5 cm and wherein the separator does not comprise a layer of rubber, wherein the diffusive mat faces or is in contact with a positive electrode or positive plate to improve oxidation resistance of the battery.

2. The flooded lead acid battery of claim 1 wherein said diffusive mat has a three hour wick in a range of 2.5-10.0 cm.

3. The flooded lead acid battery of claim 1 wherein said diffusive mat has: a MD stiffness of greater than 90 mN, and a CMD stiffness of greater than 45 mN.

4. The flooded lead acid battery of claim 1 wherein said diffusive mat is made of synthetic fibers, glass fibers, or a combination of both.

5. The flooded lead acid battery of claim 1 wherein said rubber comprises no more than 12% by weight of the separator.

6. The flooded lead acid battery of claim 1 wherein said rubber comprises 2.5-3.5% by weight of the separator.

7. The flooded lead acid battery of claim 1 wherein said rubber is a latex.

8. The flooded lead acid battery of claim 1 wherein said rubber is a natural or a synthetic latex.

9. The flooded lead acid battery of claim 1 wherein said rubber is a natural rubber.

10. The flooded lead acid battery of claim 1 wherein said microporous membrane is a microporous sheet of filled polyethylene.

11. The flooded lead acid battery of claim 1 wherein said diffusive mat further comprises glass fibers.

12. The flooded lead acid battery of claim 1 wherein said diffusive mat further comprises a natural fiber.

13. The flooded lead acid battery of claim 1 wherein said diffusive mat has an electrical resistance of 12 mohm $cm^2$ or greater.

14. The flooded lead acid battery of claim 1 selected from inverter batteries, enhanced flood batteries (EFB), ISS batteries, stationary batteries, or golf cart batteries.

15. The flooded lead acid battery of claim 1, wherein the particulate filler is particulate silica.

16. The flooded lead acid battery of claim 1, wherein the flooded lead acid battery is a dry charge flooded lead acid battery comprising contaminated water or acid, wherein the contaminated water or acid comprises contaminants that are transition metals.

17. The flooded lead acid of claim 16, wherein the transition metals are one or more selected from chromium, manganese, titanium, and copper.

18. The flooded lead acid battery of claim 17, wherein chromium, manganese, and/or titanium are present in amounts greater than 2.0 ppm.

19. The flooded lead acid battery of claim 17, wherein copper is present in an amount more than 26 ppm.

* * * * *